United States Patent
McInally et al.

(10) Patent No.: US 7,225,973 B2
(45) Date of Patent: Jun. 5, 2007

(54) SELF-SERVICE TERMINAL

(75) Inventors: Robert McInally, Edinburgh (GB); Sean P. McCarthy, West Lothian (GB)

(73) Assignee: NCR Corporation, Dayton, OH (US)

( * ) Notice: Subject to any disclaimer, the term of this patent is extended or adjusted under 35 U.S.C. 154(b) by 203 days.

(21) Appl. No.: 10/886,317

(22) Filed: Jul. 7, 2004

(65) Prior Publication Data
US 2005/0006459 A1 Jan. 13, 2005

(30) Foreign Application Priority Data
Jul. 9, 2003 (GB) .................................. 0316003.3

(51) Int. Cl.
*G06K 5/00* (2006.01)
*G06Q 40/00* (2006.01)
*G07D 11/00* (2006.01)
*G07F 19/00* (2006.01)
*G06F 17/30* (2006.01)
*G07G 1/00* (2006.01)

(52) U.S. Cl. ....................... 235/379; 235/380; 235/382; 705/43; 705/10

(58) Field of Classification Search ................ 235/379, 235/380, 381, 375, 376; 705/14, 43; 715/505, 715/801; 345/156; 702/176; 713/201; 709/228
See application file for complete search history.

(56) References Cited

U.S. PATENT DOCUMENTS

| | | | | |
|---|---|---|---|---|
| 3,943,335 A | * | 3/1976 | Kinker et al. ................ | 235/379 |
| 5,915,246 A | * | 6/1999 | Patterson et al. ............. | 705/43 |
| 6,412,008 B1 | * | 6/2002 | Fields et al. ................. | 709/228 |
| 6,581,024 B1 | * | 6/2003 | Shimizu ...................... | 702/176 |
| 6,624,803 B1 | * | 9/2003 | Vanderheiden et al. ..... | 345/156 |
| 6,726,094 B1 | * | 4/2004 | Rantze et al. ................ | 235/379 |
| 2002/0139842 A1 | * | 10/2002 | Swaine ........................ | 235/379 |
| 2003/0040959 A1 | * | 2/2003 | Fei et al. ...................... | 705/14 |
| 2003/0093473 A1 | * | 5/2003 | Hara ............................ | 709/203 |
| 2004/0034797 A1 | * | 2/2004 | Becker et al. ............... | 713/201 |
| 2004/0039990 A1 | * | 2/2004 | Bakar et al. ................. | 715/505 |
| 2004/0217163 A1 | * | 11/2004 | Savage ........................ | 235/380 |
| 2005/0039137 A1 | * | 2/2005 | Bellwood et al. ........... | 715/801 |
| 2005/0091161 A1 | * | 4/2005 | Gustin et al. ................. | 705/43 |

FOREIGN PATENT DOCUMENTS

| | | |
|---|---|---|
| EP | 0 802 684 A2 | 10/1997 |
| EP | 0 924 668 A2 | 6/1999 |
| GB | 2 299 433 A | 10/1996 |

OTHER PUBLICATIONS

"Personal Computer Environment Control Via a Proximity Sensor", Aug. 1, 1993, IBM Technical Disclosure Bulletin, vol. 36, issue No. 8, pp. 343-346.*

* cited by examiner

*Primary Examiner*—Michael G. Lee
*Assistant Examiner*—Thien T. Mai
(74) *Attorney, Agent, or Firm*—Priest & Goldstein PLLC

(57) ABSTRACT

A self-service terminal (10) comprising a user interface (14) including a display (30) is described. The display has a display area (80) for presenting financial information to a user (12). The terminal (10), which may be an ATM, comprises: a sensor (16) for sensing people in the vicinity of the terminal (10), and means (74) for confining transaction information to a sub-portion (84) of the display area in response to the sensor (16) sensing people in the vicinity of the terminal (10). A method of improving privacy on a self-service terminal is also described.

20 Claims, 4 Drawing Sheets

SELF-SERVICE TERMINAL

BACKGROUND OF THE INVENTION

The present invention relates to a self-service terminal, such as an automated teller machine (ATM), including a display for guiding a user through a transaction.

Self-service terminals are generally public-access devices that are designed to allow a user to conduct a transaction or to access information in an unassisted manner and/or in an unattended environment. SSTs typically include some form of tamper resistance, in both hardware and software. SSTs include: ATMs; non-cash kiosks that allow users to access information (for example, to view reward points on a reward card the user has inserted into the SST); and kiosks that accept payment for services (for example, Web surfing kiosks, photo printing kiosks, kiosks that allow users to buy goods, and such like). The term SST has a relatively broad meaning and includes vending machines.

An ATM is one type of SST, and typically includes a display that presents a series of screens to a user to help the user execute a transaction at the ATM. With the decreasing cost of displays, and the increased amount of information to be presented to users, there has been a recent trend towards incorporating bigger displays in ATMs. Previously, 10 inch displays were conventionally used in ATMs; whereas, it is becoming common to include 15 inch displays on ATMs.

One problem associated with using bigger displays is that a user may perceive that the transaction is not private because passers-by or people queuing to use the ATM may be able to see the display during a transaction.

To address this problem, ATMs conventionally use a privacy filter comprising a series of thin, spaced, vertical slats encapsulated within a transparent glass frame and mounted in front of the display. This privacy filter restricts the viewing angle to a direction generally normal to the surface of the filter. As a result, someone standing directly in front of the ATM can view the ATM display, but someone standing to one side of the ATM cannot view the display. However, the privacy filter does not prevent someone standing behind an ATM user from looking over the ATM user's shoulder to see the display.

SUMMARY OF THE INVENTION

It is among the objects of an embodiment of the present invention to obviate or mitigate one or more of the above disadvantages or other disadvantages of the prior art.

The invention relates generally to a display that is able to reduce the viewing area when a transaction is being executed to make it more difficult for a third party to view a transaction.

According to a first aspect of the present invention there is provided a self-service terminal comprising a user interface including a display having a display area for presenting financial information to a user, a sensor for sensing people in the vicinity of the terminal, and means for confining transaction information to a sub-portion of the display area in response to the sensor sensing people in the vicinity of the terminal.

Preferably, the means for confining transaction information to a sub-portion of the display area confines the transaction information to less than 70% of the display area.

Preferably, the means for confining transaction information to a sub-portion of the display area reduces text font size less than spacing between text so that the text scales down less than the spacing. This ensures that the text is not too small to read.

In some embodiments it may be possible to retain the font size of information presented so that the information is no more difficult to read than prior to confining the transaction information to a sub-portion of the display area.

In a preferred embodiment, the terminal is an ATM and the transaction information is presented in the form of a series of screens.

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

In a preferred embodiment, the screens are provided as mark-up language files, such as XML or HTML files.

The means for confining transaction information to a sub-portion of the display area may ensure that an area around the sub-portion is blank, de-focused, or used for displaying advertising information. Alternatively, the means for confining transaction information may provide lead lines from selectable options presented on a reduced size screen to function display keys provided on opposing edges of the display. This ensures that the selectable options on a reduced size screen align with the corresponding FDKs at the edges of the display.

The means for confining transaction information is preferably implemented by a screen reducing software application. In one embodiment, a mark-up language file is used for each screen, and the application applies a style sheet to these files so that the font size of text on a screen remains the same even after the screen has been shrunk to a sub-portion of the display area.

In one embodiment, the means for confining transaction information is implemented by an application that scales a screen image to fit the desired sub-portion of the display area. This embodiment is simple to implement, but is less preferred because it reduces the size of text presented on the display by the same amount as the spacing between text.

According to a second aspect of the present invention there is provided a method of improving privacy on a self-service terminal, the method comprising: presenting information to a user on a display; sensing people in the vicinity of the terminal; and confining transaction information to a sub-portion of the display area in response to the sensor sensing a person other than the user in the vicinity of the terminal.

The step of confining transaction information to a sub-portion of the display area may occur automatically in response to the sensor sensing a person other than the user, or the step may only be performed after the user indicates that he/she would like the transaction to be confined to a sub-portion of the screen. This may be advantageous in areas having a high pedestrian traffic but which are, nevertheless, relatively private.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
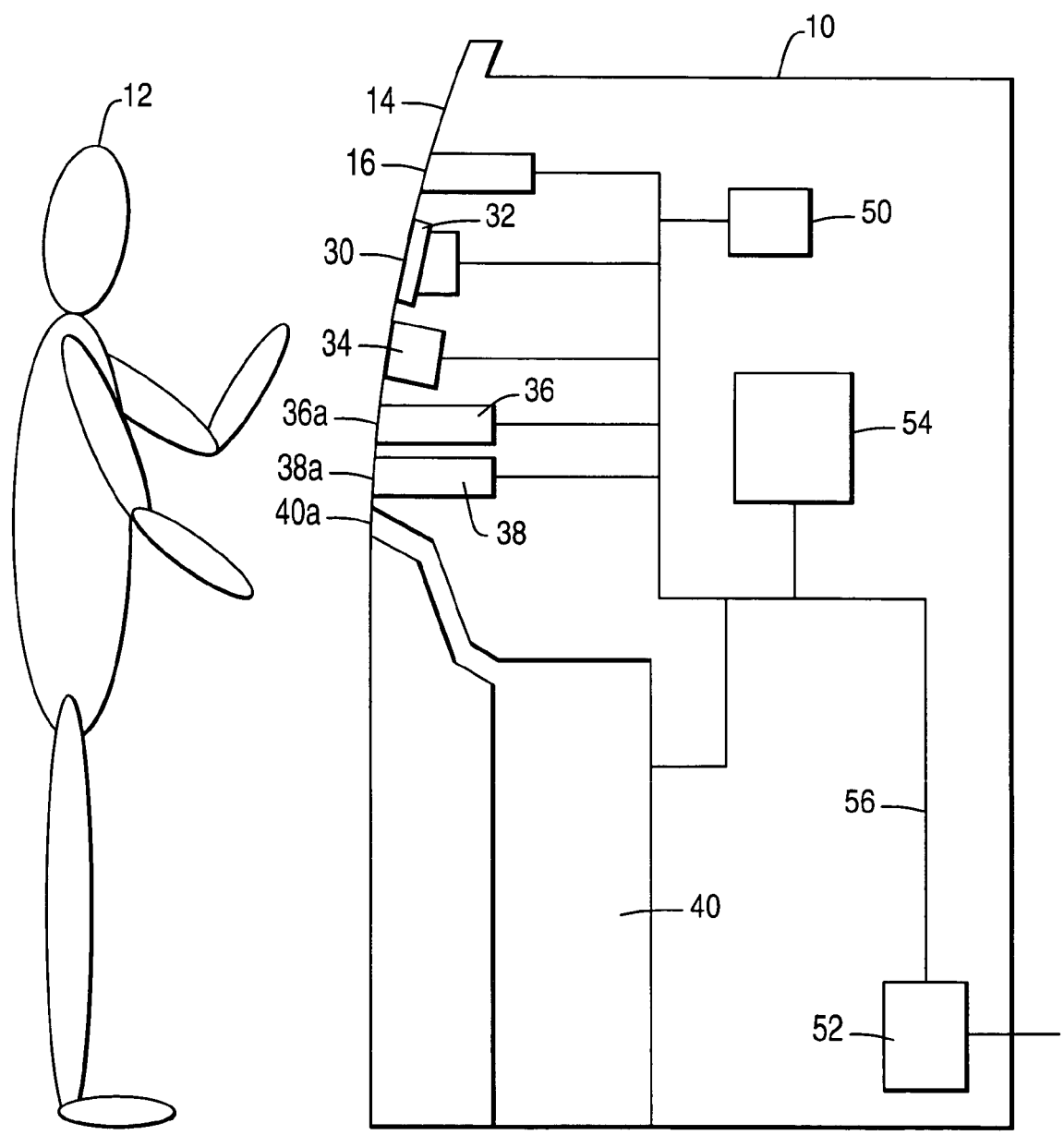
FIG. 1 is a block diagram of a self-service terminal according to one embodiment of the present invention.

Reference is now made to FIG. 1, which illustrates an SST 10 in the form of an ATM being operated by a user 12.

The ATM 10 includes a user interface 14 for outputting information to a user and for allowing a user to input information.

The user interface 14 comprises a molded fascia incorporating: a sensor 16 in the form of a passive infra-red (PIR) sensor, a display module 30 surrounded by function display keys 32, an encrypting keypad module 34, and a plurality of slots aligned with modules located behind the fascia. The slots include a card entry/exit slot 36a that aligns with a magnetic card reader/writer (MCRW) module 36, a printer slot 38a that aligns with a printer module 38, and a cash dispense slot 40a that aligns with a cash dispense module 40.

The ATM 10 also includes an internal journal printer module 50 for creating a record of all transactions executed by the ATM 10, a network connection module 52 for communicating with a remote transaction host (not shown) for authorizing transactions, and an ATM controller module 54 for controlling the operation of the various modules (30 to 52). All of the modules (30 to 54) within the ATM 10 are interconnected by an internal bus 56 for securely conveying data.

Figure 2:
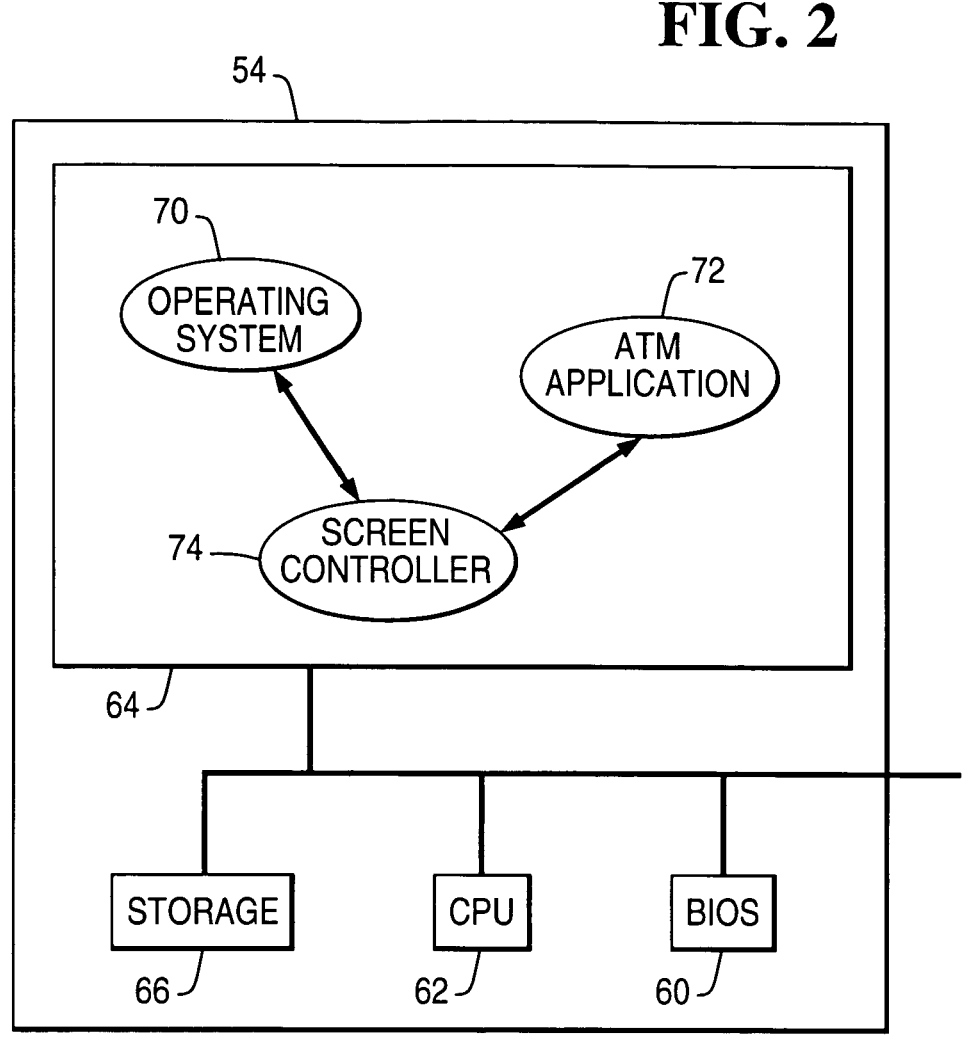
FIG. 2 is a block diagram of a part (the controller) of the terminal of FIG. 1.
Figure 4:
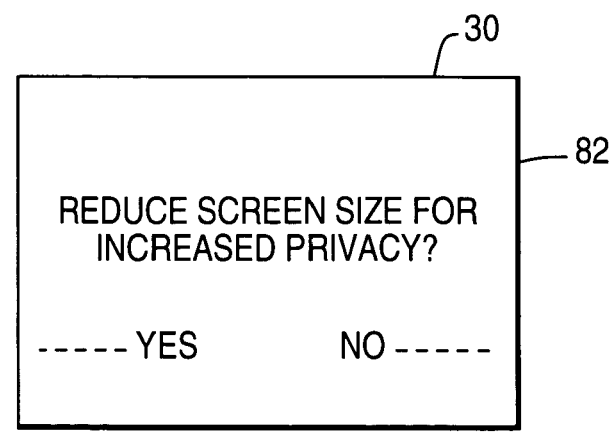
FIG. 4 illustrates a screen presented to a user when another person is detected in the vicinity of the terminal of FIG. 1.

The ATM controller module 54 (which is a PC core) is shown in more detail in FIG. 2. The controller 54 comprises a BIOS 60 stored in non-volatile memory, a microprocessor 62, associated main memory 64, and storage space 66 in the form of a magnetic disk drive.

In use, the ATM 10 loads the main memory 64 with: an operating system kernel 70, control means 72 (in the form of an ATM application program), and means 74 for confining transaction information to a sub-portion of the screen in the form of a screen controller program.

The ATM application program 72 is used to control the operation of the ATM 10. In particular, the ATM application program 72: provides the sequence of screens used in each transaction (referred to as the transaction flow); monitors the condition of each module within the ATM (state of health monitoring); and interfaces with the screen controller program 74. The screens are provided in XML format in this embodiment and are conveyed from the ATM application program 72 to the operating system 70 via the screen controller 74.

An example of a typical transaction at the ATM 10 will now be described with reference to FIGS. 3A to 3F. During this transaction, the ATM 10 does not detect any other person in the vicinity of the ATM 10.

Initially, the user 12 inserts his/her card through slot 36a. The ATM 10 detects this card, and the ATM application 72 presents a PIN entry screen 80a (FIG. 3A) to the user 12. When the user 12 enters the last digit of his/her four digit PIN, then the ATM application 72 presents a transaction options screen 80b (FIG. 3B) listing the available transaction options to the user 12.

The user 12 selects a transaction option from the list using an FDK 32 aligned with the desired option.

The next screen presented in the transaction flow depends on the option selected by the user 12. In this example, the user 12 has selected the cash withdrawal option, so a cash amount screen 80c (FIG. 3C) is presented to the user 12 by the ATM application 72.

After selecting or entering an amount of cash to be dispensed, the user 12 is presented with an authorization screen 80d (FIG. 3D) while the ATM control module 54 attempts to obtain authorization for the transaction from a remote transaction host (not shown).

If authorization is successful then the ATM application 72 presents the user 12 with a card remove screen 80e (FIG. 3E) while the ATM 10 partially ejects the user's card through slot 36a for removal by the user 12.

Figure 3A:
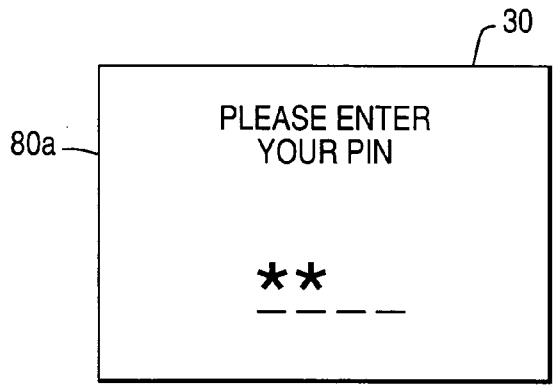
FIGS. 3A to 3F illustrate a sequence of screens displayed on the terminal of FIG. 1 when the terminal is operating in a first mode.
Figure 3D:
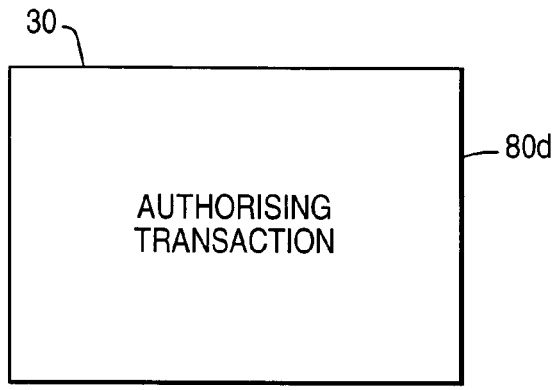
Figure 3B:
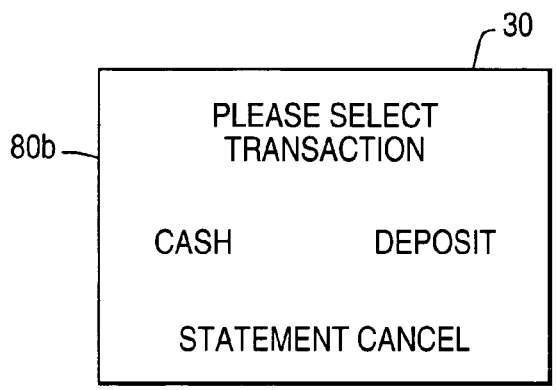
Figure 3E:
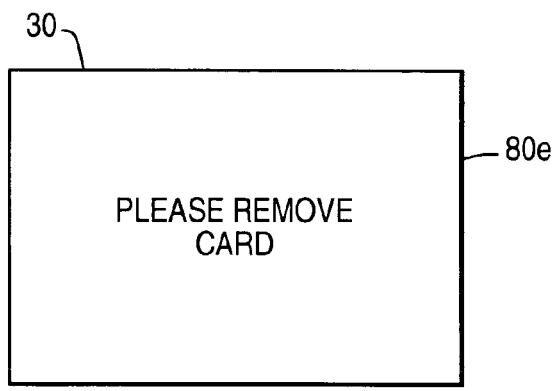
Figure 3C:
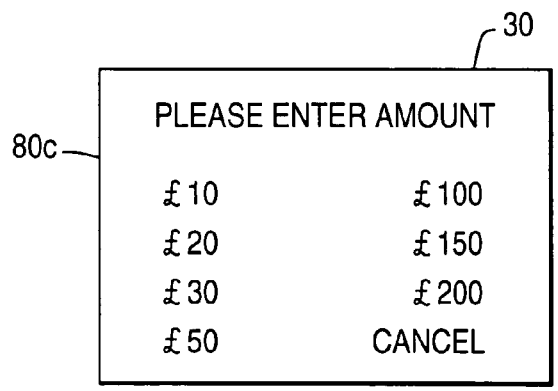
Figure 3F:
Figure 5A:
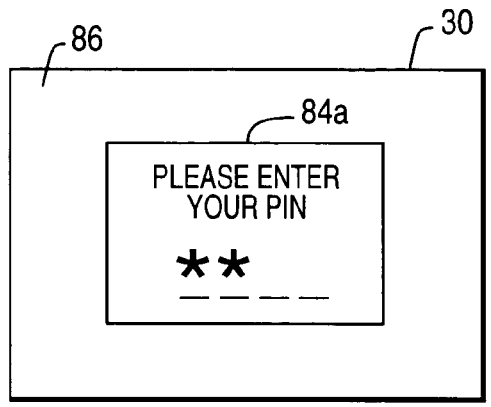
FIGS. 5A to 5F illustrate a sequence of screens displayed on the terminal of FIG. 1 when the terminal is operating in a second mode.
Figure 5B:
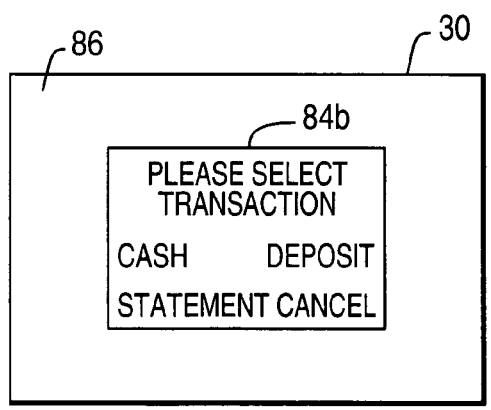
Figure 5C:
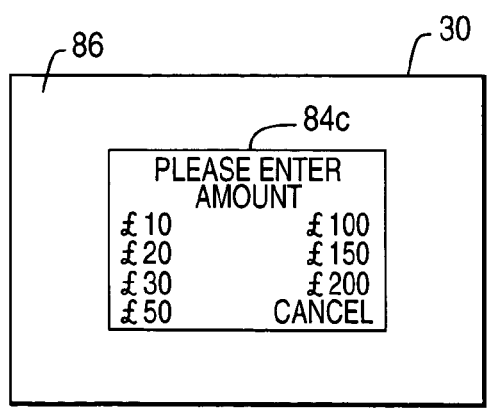
Figure 5D:
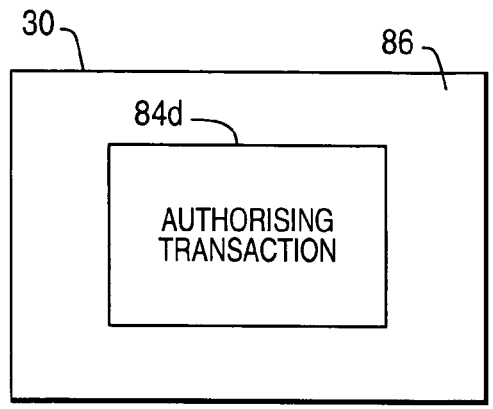
Figure 5E:
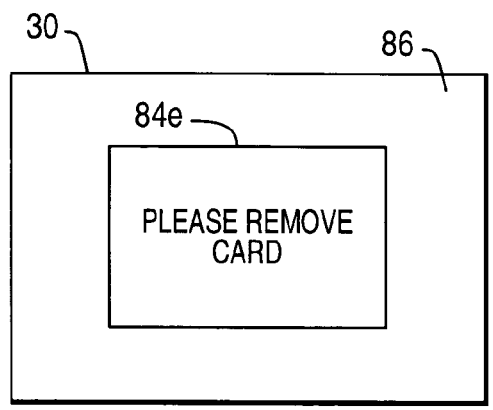
Figure 5F:
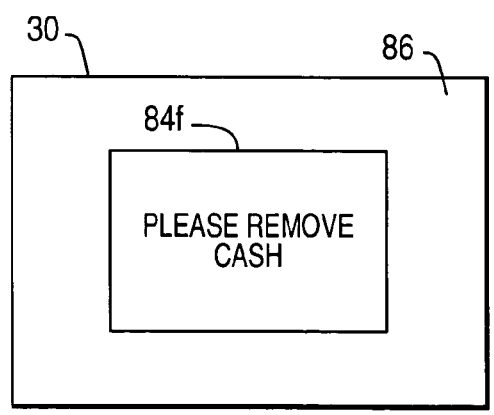

After the card has been removed by the user 12, the ATM application 72 presents the user 12 with a cash removal screen 80f (FIG. 3F).

When the user 12 has removed the dispensed cash, then the transaction is complete and the ATM application 72 reverts to an attract sequence.

Another example of a typical transaction at the ATM 10 will now be described with reference to FIG. 4 and FIGS. 5A to 5F. During this transaction, which is identical to the transaction of the previous example, the ATM 10 detects another person in the vicinity of the ATM 10.

Initially, the user 12 inserts his/her card through slot 36a. The ATM 10 detects this card, and the ATM 10 also detects, via sensor 16, another person standing in the vicinity of the ATM 10. This causes the ATM application 72 to present a privacy request screen 82 (FIG. 4) to the user 12. The privacy request screen 82 informs the user of the option of reducing the size of the screen for improved security and asks the user 12 to accept or reject this option. In this example the privacy request screen 82 is shown as full size, but in other examples, the privacy request screen 82 may be shown at a reduced size corresponding to the size that a screen would be presented if the user selects the privacy option.

If the user 12 rejects the improved security option then the transaction proceeds in the same way as for the previous example (FIGS. 3A to 3F).

If the user 12 accepts the improved security option then this causes the screen controller program 74 to operate on all transaction related screens, as illustrated in FIGS. 5A to 5F. In the previous example (FIGS. 3A to 3F), the screen controller 74 allowed screens supplied by the ATM application 72 to be presented full-size without any modification. However, when the screen controller 74 is activated, the screen controller 74 may modify the screens provided by the ATM application 72. This ensures that screens are presented that cover only a sub-portion of the display 30.

The screen controller 74 modifies the size of a screen by applying an XSL stylesheet to the XML screens, which reduces the spacing between words to allow the text to fit into a smaller screen area.

The reduced size PIN entry screen 84a is generally centrally located on display 30 and includes a surround area 86 that is not used for information related to the transaction being executed.

The transaction proceeds in the same manner as for the example described with reference to FIGS. 3A to 3F. Once the transaction has been completed, the screen controller 74 is de-activated and the attract sequence is presented as a full size screen or screens.

It will now be appreciated that the above embodiment has the advantage that an ATM can provide increased privacy by reducing the viewable size of a display during a transaction. By using stylesheets it is possible to use the same screen data for either a full size screen or a reduced size screen.

Various modifications may be made to the above embodiments within the scope of the present invention. For example, in other embodiments, the self-service terminal may be a non-cash kiosk, or a point of sale terminal.

In some embodiments, the ATM application 72 may provide XML format screen data to the screen controller 74, and the screen controller 74 applies either a first XSL stylesheet to configure the XML format screen data for a full size screen or a second XSL stylesheet to configure the XML format data for a reduced size screen to reduce the viewable area of a display.

In other embodiments, the screen controller may automatically reduce the screen size if the sensor 16 detects another person, thus privacy request screen 82 would not be required.

In other embodiments, for example where a touch sensitive screen is used, the user 12 may be able to move the reduced size screen to any desired area of the display 30.

In other embodiments, the area 86 around the reduced size screen may display advertisements or other non-confidential information.

In other embodiments, a user may have a pre-selected screen size. For example, a user may have a screen size referenced by a customer relationship management system or stored the user's identification token, such as his/her card.

In other embodiments, the means for confining transaction information to a sub-portion of the display area may de-focus areas of the display outside the reduced size screen.

This may be achieved in software using a mathematical filter, or in hardware using a voltage-controlled variable refractive index coating.

What is claimed is:

1. A self-service terminal comprising:
   a user interface including a display having a display area for presenting transaction information to a user;
   a sensor for sensing people in the vicinity of the terminal; and
   means for displaying the transaction information in first size screens having a size substantially the same as the display area, and displaying the transaction information in second size screens substantially smaller than the display area in response sensing of one or more additional persons in the vicinity of the terminal during a transaction by a first person at the terminal.

2. A terminal according to claim 1, wherein the means for displaying the transaction information displays the transaction information in second size screens having an area less than 70% of the display area.

3. A terminal according to claim 1, wherein the means for displaying the transaction information uses the same font size for information presented in both the first size screens and the second size screens.

4. A terminal according to claim 1, wherein the means for displaying the transaction information reduces text font size of text less than spacing between the text so that the text scales down less than the spacing in converting the first size screens to the second size screens.

5. A terminal according to claim 1, wherein the means for displaying the transaction information provides lead lines from selectable options presented on the second size screens to function display keys located along an edge of the display.

6. A terminal according to claim 1, wherein the means for displaying the transaction information utilizes an area around the second size screens for displaying advertising information.

7. A terminal according to claim 1, wherein the means for displaying the transaction information comprises a screen reducing software application.

8. A terminal according to claim 7, wherein a mark-up language file is used to describe a first size screen, and the screen reducing software application applies a stylesheet to the file to create a reduced sized second size screen corresponding to the first size screen.

9. A method of improving privacy on a self-service terminal, the method comprising:
   presenting transaction information to a user on a display utilizing a plurality of first size screens;
   sensing people in the vicinity of the terminal; and
   displaying the transaction information utilizing a plurality of second size screens substantially smaller than the first size screens when any person other than the user is sensed in the vicinity of the terminal.

10. A method according to claim 9, wherein the step of displaying the transaction information utilizing the plurality of second size screens occurs automatically when a person other than the user is sensed in the vicinity of the terminal.

11. A method according to claim 9, wherein the step of displaying the transaction information utilizing the plurality of second size screens occurs after a user selection.

12. An automated teller machine (ATM) comprising:
   a cash dispenser for dispensing cash to an ATM customer when the ATM customer conducts an ATM cash dispensing transaction;
   an ATM customer interface including a display having a display area for presenting ATM cash dispensing transaction information to an ATM customer conducting an ATM cash dispensing transaction;
   a sensor for sensing a person other than an ATM customer in the vicinity of the ATM; and
   means for displaying the ATM cash dispensing transaction information in first size screens having a size substantially the same as the display area, and displaying the ATM cash dispensing transaction information in second size screens substantially smaller than displays the display area when an ATM customer is using the ATM to conduct an ATM transaction and the sensor senses any person in the vicinity of the ATM other than the ATM customer currently conducting the ATM transaction.

13. An ATM according to claim 12, wherein the means for displaying the ATM cash dispensing transaction information displays the ATM cash dispensing transaction information, in second size screens having an area less than 70% of the display area.

14. An ATM according to claim 12, wherein the means for displaying the ATM cash dispensing transaction information uses the same font size for information presented in both the first size screens and the second size screens.

15. An ATM according to claim 12, wherein the means for displaying the ATM cash dispensing transaction information reduces text font size of text less than spacing between the text so that the text scales down less than the spacing in converting the first size screens to the second size screens.

16. An ATM according to claim 12, wherein the means for displaying the ATM cash dispensing transaction information provides lead lines from selectable options presented on the second size screens to function display keys located along an edge of the display.

17. An ATM according to claim 12, wherein the means for displaying the ATM cash dispensing transaction information utilizes an area around the second size screens for displaying advertising information.

18. An ATM according to claim 12, wherein the means for displaying the ATM cash dispensing transaction information comprises a screen reducing software application.

19. An ATM according to claim 18, wherein a mark-up language file is used to describe a first size screen, and the screen reducing software application applies a stylesheet to the file to create a reduced sized second size screen corresponding to the first size screen.

20. A method of operating an automated teller machine (ATM) when an ATM customer conducts an ATM transaction, the method comprising:
  presenting ATM cash dispensing transaction information to the ATM customer on a display having a display area utilizing a plurality of first size screens;
  sensing a person other than the ATM customer in the vicinity of the ATM;
  displaying the ATM cash dispensing transaction information presented on the display utilizing a plurality of second size screens substantially smaller than the first size screens when any person other than the ATM customer is sensed in the vicinity of the ATM; and
  dispensing cash to the ATM customer.

* * * * *